United States Patent [19]
Rhodes

[11] Patent Number: 4,928,578
[45] Date of Patent: May 29, 1990

[54] PISTONS WITH BEARING MEMBERS

[75] Inventor: Michael L. P. Rhodes, Rugby, England

[73] Assignee: AE PLC, Rugby, England

[21] Appl. No.: 123,786

[22] Filed: Nov. 23, 1987

[30] Foreign Application Priority Data

Dec. 5, 1986 [GB] United Kingdom ............... 8629207

[51] Int. Cl.⁵ ........................... F16J 1/14; F22B 5/00
[52] U.S. Cl. ................................... 92/187; 92/216; 92/220; 123/193 P; 74/579 E; 403/156; 403/162
[58] Field of Search ................ 92/187, 191, 216, 220, 92/212, 188; 123/193 P; 403/150, 151, 156, 158, 162; 74/579 E

[56] References Cited

U.S. PATENT DOCUMENTS

| | | | |
|---|---|---|---|
| 2,687,931 | 9/1954 | Flynn | 92/187 |
| 3,027,207 | 3/1962 | Meurer | 92/187 |
| 3,053,595 | 9/1962 | Dilworth | 92/187 |
| 3,357,318 | 12/1967 | Packard et al. | 92/187 |
| 3,403,605 | 10/1968 | Schmidt | 92/187 |
| 3,762,389 | 10/1973 | Malina | 92/187 |
| 3,765,307 | 10/1973 | Neel, Jr. | 92/187 |
| 3,877,350 | 4/1975 | Early et al. | 403/152 |
| 3,903,752 | 9/1975 | Riffe | 74/579 E |
| 3,971,355 | 7/1976 | Kottmann | 74/579 E |
| 4,013,057 | 3/1977 | Guenther | 403/152 |
| 4,358,881 | 11/1982 | Mahrus et al. | 92/190 |
| 4,544,299 | 10/1985 | Danckert | 403/151 |
| 4,743,136 | 5/1988 | Danckert | 92/187 |

FOREIGN PATENT DOCUMENTS

| | | | |
|---|---|---|---|
| 188549 | 1/1957 | Austria | 403/152 |
| 393108 | 7/1908 | France | 123/193 P |
| 1369205 | 6/1964 | France | 403/152 |
| 0134439 | 10/1929 | Switzerland | 92/220 |

Primary Examiner—Robert E. Garrett
Assistant Examiner—Thomas Denion
Attorney, Agent, or Firm—William R. Hinds

[57] ABSTRACT

Pistons are described comprising a crown portion and a skirt portion, the crown portion having depending from the underside thereof a boss, the boss having secured thereto at least two bearing members in fixed relationship to the piston body and which bearing members co-operate with an associated connecting rod. The bearing members may be located in rebates in the boss such that piston firing loads are born substantially in compression. The bearing members are in one embodiment secured to the boss by a bolt and nut. The bearing members may comprise ferrous, copper-based or aluminium based alloys depending upon the application environment.

6 Claims, 3 Drawing Sheets

PISTONS WITH BEARING MEMBERS

The present invention relates to pistons and in particular to pistons for use in internal combustion engines.

In recent years great emphasis has been placed on the reduction of size and weight in internal combustion engines. Nowhere has this emphasis been more apparent than in engines for automotive uses, especially passenger vehicles. Reduction in weight, especially in reciprocating mass, of components such as pistons allows other consequential weight savings to be made in components co-operating with the piston. With regard to engine size, particularly engine height; reduction thereof allows lower bonnet lines leading to fuel savings due to improved aerodynamics.

One factor allowing the physical height of an engine to be reduced is a reduction in the compression height of the piston. The compression height of a piston is the axial distance between the gudgeon-pin axis and the top of the piston crown.

One method which has been used successfully to reduce compression height is the use of a piston crown having only two piston rings instead of the more usual three One example of such a piston is described in published European Patent Application No. 0192114 of common ownership herewith.

Another approach to reducing piston compression height has been to attempt to move the gudgeon-pin axis closer to the top of the piston crown and indeed to depart from the traditional concept of a gudgeon-pin which bears the total engine firing load in the portion disposed between the piston gudgeon-pin bosses. One such proposal is described in GB patent application No. 2165619 wherein the loads are borne by both the gudgeon-pin and by the top of the connecting rod small end eye which bears simultaneously on the underside of the piston crown either directly or via an intermediate wear-resistant insert. The principal problem with this arrangement is that virtually no machining tolerances are permissible if the loads are to be borne simultaneously on both the gudgeon-pin and the top of the connecting rod small end.

Another approach which has been tried is to support the whole length of the gudgeon-pin on the underside of the crown and to attach the connecting rod thereto by other than a normal small end eye. DE-OLS-3332300A1 shows an arrangement where the gudgeon-pin is in the form of an I-beam with curved faces and the connecting rod is clinched into the I-beam channels.

A serious problem which ensues when attempting to provide a bearing surface for the gudgeon-pin or connecting rod small end directly, or via an insert, on the underside of the crown is that caused by the greatly increased temperature in this region. The closer one moves the actual bearing surfaces towards the crown underside the greater is the temperature. If the bearing surface is placed directly on the crown underside the temperature problem is exacerbated due to the direct conduction of heat through the crown into the bearing surface. The result of this is that lubricants are degraded and the mating bearing surfaces between the aluminium alloy and the ferrous material can partially seize, a condition known as "scuffing".

It is an object of the present invention to move the axis of relative movement between the piston and the connecting rod closer to the crown whilst maintaining the bearing surfaces themselves in a relatively cooler region where adequate lubrication may be supplied. It is a further object to provide bearing surfaces for relative movement between the piston and connecting rod which do not necessarily include the alloy of which the piston body is constructed. A yet further object is to reduce piston assembly weight. For a given cylinder block height it is an object to provide a piston having a reduced compression height and thus a lengthened connecting rod. One effect of a lengthened connecting rod is to reduce reciprocating and secondary out-of-balance forces. Side thrust loadings may also be reduced which may in turn result in reduced piston noise levels and reduced friction.

According to the present invention a piston comprises a crown portion and a skirt portion, the crown portion having a single boss depending from the underside thereof, the boss including two generally axially extending faces, the faces each having a rebate formed therein, the boss having secured thereto, in fixed relationship to the piston body, two cylindrical bearing members, one bearing member located in each of the rebates, and which bearing members cooperate with the small end of an associated connecting rod so as to transmit combustion firing loads to the connecting rod substantially in compression while providing bearing surfaces for relative oscillating movement between the piston and connecting rod.

In one embodiment of the present invention the bearing members comprise a ferrous material and the piston an aluminium alloy.

In order that the present invention may be more fully understood examples will now be described by way of illustration only with reference to the accompanying drawings of which:

Figure 4:
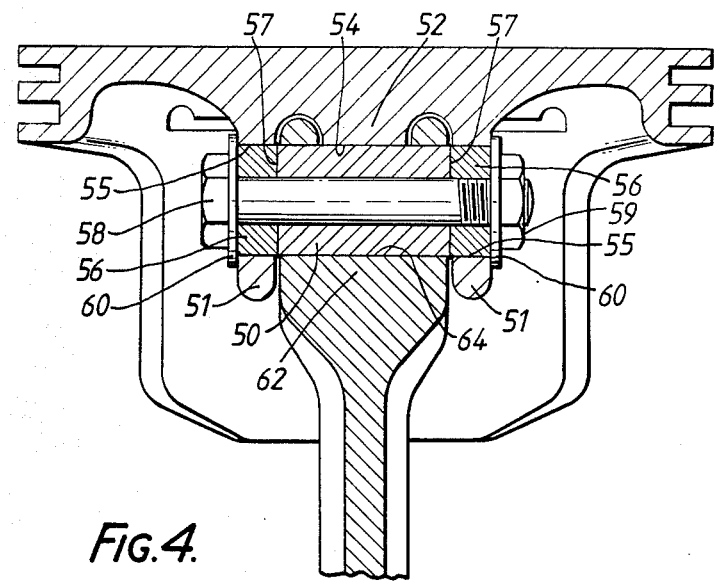
FIG. 4 shows an alternative embodiment of a piston.
Figure 5:
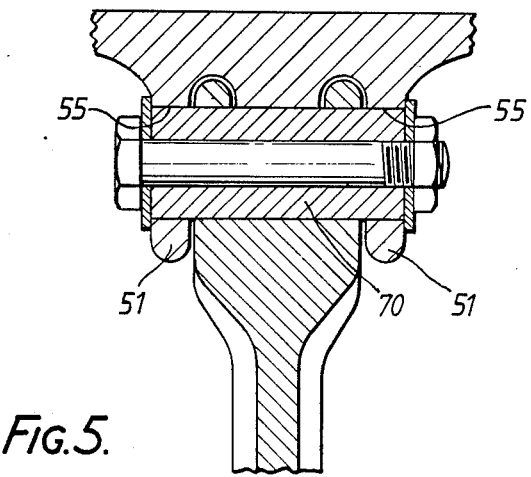

FIG. 5 which shows a fragmentary view of a modification of the embodiment shown in FIG. 4.

Figure 1:
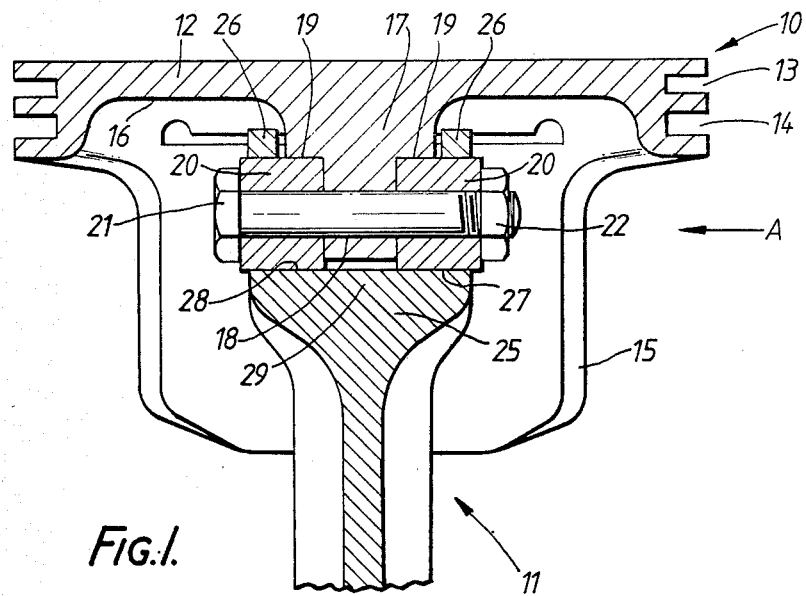
FIG. 1 shows a section of a piston according to the present invention through a plane which includes both the piston axis and the axis of the piston and connecting rod pivot.
Figure 2:
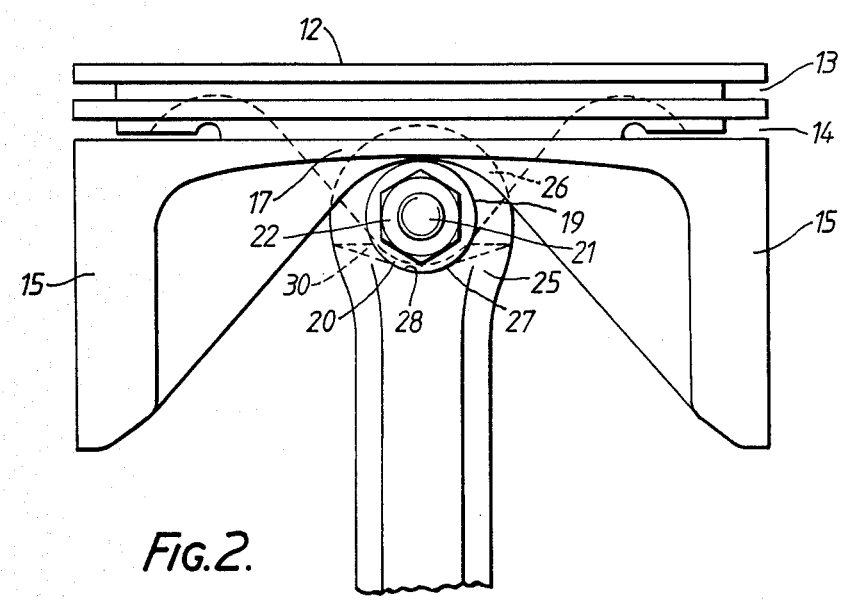
FIG. 2 shows a view of the piston of FIG. 1 in the direction 'A'.

Referring now to FIGS. 1 and 2 of the drawings and where the same features are denoted by common reference numerals.

A piston is denoted generally at 10 assembled to a connecting rod (part shown) denoted generally at 11. The piston 10 comprises a crown portion 12 having a piston ring belt in which there are two piston ring grooves 13 and 14. The piston further comprises a skirt portion 15 for accepting thrust loads during operation in an associated cylinder (not shown). Depending from the underside 16 of the crown portion 12 and formed integrally therewith is a boss 17. The boss 17 has a hole 18 formed therethrough. Two circular rebated portions 19 are formed, one each side, on the boss 17. Co-operating with the two rebates 19 are two cylindrical steel bearing members 20. The bearing members 20 are secured to the boss 17 by a dowel bolt and nut 21, 22 so that the members 20 are maintained in fixed relationship to the piston 10 and are mutally coaxial. The connecting rod 11 has a bifurcated small end 25, the small end 25 havlnq two portions 26 which co-operate with those portions of the bearing members 20 which extend beyond the rebates 19. The lower face 27 of the small end bears against the lowermost faces 28 of the members 20. In the central portion 29 of the bifurcated small end 25 is a shallow trough 30.

In operation the firing loads in the engine are borne directly on the co-operating faces 27 and 28 of the connecting rod and bearing members 20 respectively and in the rebates 19 in the boss 17. Because there are virtually no bending loads as with a conventional gudgeon-pin and because the bearing members 20 combined with the bolt 21 are effectively solid there is practically no distortion in the members 20 and their diameters may be reduced in comparison with that required in a conventional gudgeon-pin. The retaining bolt 21 is not subjected to any significant bending loads and, therefore, may be of relatively small section. The portions 26 need be only of sufficient strength to withstand the inertia forces generated by the piston. Such inertia forces will be lower because of the lower weight of the piston. The trough 30 acts as an oil reservoir so that the faces 27 and 28 where all the relative motion between the piston and connecting rod occurs is always well-lubricated. Because the area of relative motion is relatively remote from the underside 16 of the piston crown 12 the temperatures are lower.

The connecting rod small end may be fitted with, for example, a bronze bush to provide an improved bearing material rather than the connecting rod material itself. Alternatively the bearing members 20 may comprise a material such as a leaded or phosphor bronze, for example, and co-operate directly with the connecting rod material.

Figure 3:
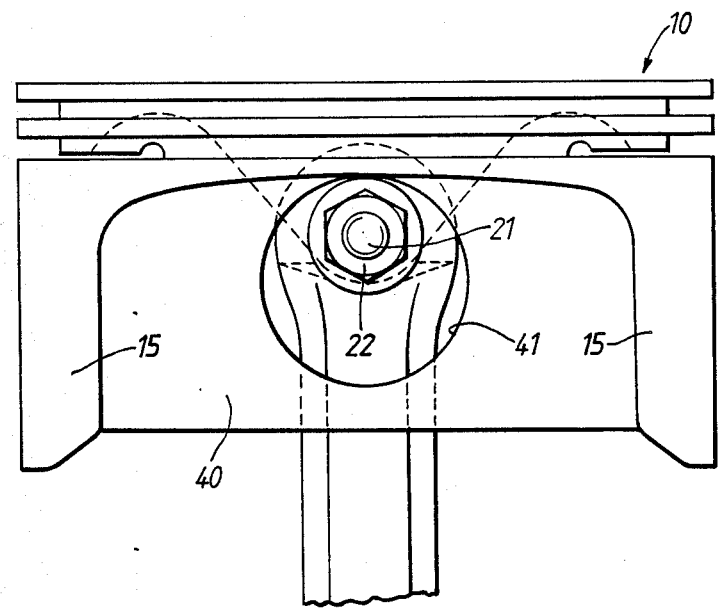
FIG. 3 shows a modification of the piston of FIGS. 1 and 2.

FIG. 3 shows a modification to the skirt portion 15 of the piston 10 in that there is a panel 40 extending between the thrust portions 15 on each side to provide enhanced stiffness in some applications. Access to the bolt and nut 21,22 is gained via apertures 41 in the panels 40.

In the embodiment shown in FIG. 4 a single steel bearing member 50 is used. Bosses 51 depend from the underside of the piston crown. A third boss 52 is disposed between the bosses 51 the bearing member 50 being in contact therewith. Machining of the contacting surface 54 of the boss 52 is effected during boring of the bosses 51 to provide bores 55. Cylindrical light alloy spacers 56 are positioned in the bores 55 and abut the end faces 57 of the member 50. The member 50 and spacers 56 are held together and in fixed relationship to the piston by means of the dowel bolt 58, nut 59 and washers 60. A birfurcated connecting rod end 62 is again used as in FIGS. 1 to 3. The firing loads on the piston are borne largely in compression through the boss 52 member 50 and connecting rod bearing surface 64.

In the modification shown in FIG. 5 a single bearing member 70 is used the member extending uninterrupted through the bores 55 of the bosses 51. This arrangement is slightly heavier than that shown in FIG. 4.

In some applications the bearing members 20 may comprise a light alloy such as a wrought aluminium-silicon-copper alloy or a modern high-strength reinforced plastics material, for example.

The portions 26, 27 which co-operate with the members 20 need not necessarily be of circular bore. They may, for example, be oval with the minor axis vertical. Therefore, the curvature of the lowermost portions of the connecting rod bearing surface 27 is of slightly greater curvature than the members 20. The effect of this is to enhance the lubrication of the bearing surface.

The invention has been illustrated with reference to a piston having two piston rings; there may, however, be any required number of rings appropriate to the application intended.

I claim:

1. A piston comprising a crown portion and a skirt portion, the crown position having a single boss depending from the underside thereof, said boss including two generally axially extending faces, said faces each having a rebate formed therein, said boss having secured thereto, in fixed relationship to the piston body, two cylindrical bearing members, one said bearing member located in each of said rebate, and which bearing members cooperate with the small end of an associated connecting rod so as to transmit combustion firing loads to said connecting rod substantially in compression while providing bearing surfaces for relative oscillating movement between the piston and connecting rod.

2. A piston according to claim 1 wherein the radius of curvature of said bearing members is less than the radius of curvature at the cooperating bearing surface on said associated connecting rod.

3. A piston according to claim 1 wherein said two bearing members are secured to said boss by a bolt the axis of which is coincident with the axes of said bearing members.

4. A piston according to claim 1 wherein said bearing members comprise a ferrous material.

5. A piston comprising a crown portion and a skirt portion, the crown portion having a boss depending from the underside thereof, said boss having secured thereto, in fixed relationship to the piston body, two bearing members, and which bearing members cooperate with an associated connecting rod, wherein said bearing members are axially spaced from each other along a common axis and are separated by an intervening part of said boss, said boss being formed with outwardly oppositely facing end surfaces generally normal to said axis, generally circular rebates extending inwardly toward each other from said end surfaces but terminating short of each other so as to define therebetween said intervening part of said boss, each bearing member being located in one of said rebates and projecting axially outwardly therefrom such that part of the upper surfaces of each bearing member bears against the upper surface of its rebate so as to transmit loads substantially in compression to said associated connecting rod, said connecting rod including surface parts encompassing said projecting parts of said bearings and bearing against the lower surface of each bearing member opposite said part of the upper surface of each bearing member.

6. A piston as claimed in claim 5 wherein said two bearing members are secured to said boss by a bolt passing through the bearing member and said intervening part of said boss.

* * * * *